US012375212B2

(12) United States Patent
Ling et al.

(10) Patent No.: US 12,375,212 B2
(45) Date of Patent: Jul. 29, 2025

(54) APPARATUS AND METHOD OF PUCCH REPETITION USING MULTIPLE BEAMS

(71) Applicant: LENOVO (BEIJING) LIMITED, Beijing (CN)

(72) Inventors: Wei Ling, Beijing (CN); Chenxi Zhu, Beijing (CN); Bingchao Liu, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 384 days.

(21) Appl. No.: 17/629,105

(22) PCT Filed: Jul. 22, 2019

(86) PCT No.: PCT/CN2019/097145
§ 371 (c)(1),
(2) Date: Jan. 21, 2022

(87) PCT Pub. No.: WO2021/012163
PCT Pub. Date: Jan. 28, 2021

(65) Prior Publication Data
US 2022/0278776 A1    Sep. 1, 2022

(51) Int. Cl.
*H04L 1/18*    (2023.01)
*H04W 72/1268*    (2023.01)
*H04W 72/21*    (2023.01)

(52) U.S. Cl.
CPC ........... *H04L 1/18* (2013.01); *H04W 72/1268* (2013.01); *H04W 72/21* (2023.01)

(58) Field of Classification Search
CPC ... H04L 1/18; H04L 1/08; H04L 5/001; H04L 5/0048; H04L 5/0053; H04L 5/0094;
(Continued)

(56) References Cited

U.S. PATENT DOCUMENTS 11,553,466 B2 *   1/2023  Jung ..................... H04B 7/0408
12,010,528 B2 *   6/2024  Kang .................... H04B 7/0695
(Continued)

FOREIGN PATENT DOCUMENTS

WO   2017052688 A1   2/2017
WO   2017024561 A1   3/2017

OTHER PUBLICATIONS

International Searching Authority, "Written Opinion of the International Searching Authority," PCT/CN2019/097145, Apr. 16, 2020, pp. 1-4.
(Continued)

*Primary Examiner* — Kan Yuen
(74) *Attorney, Agent, or Firm* — Kunzler Bean & Adamson (57) ABSTRACT

Apparatus and methods of Physical Uplink Control Channel (PUCCH) repetition using multiple beams are disclosed. The apparatus includes: a receiver that receives a configuration data indicating a spatial relation information set for a Physical Uplink Control Channel (PUCCH) resource that is configured with a preset number of repetitions, wherein the spatial relation information set is activated for the PUCCH resource by a Medium Access Control (MAC) Control Element (CE); and a transmitter that transmits each of the PUCCH repetitions in multiple time intervals according to a mapping between the spatial relation information set and each repetition.

19 Claims, 5 Drawing Sheets spatial relation information 2     spatial relation information 5     spatial relation information 6
502    504    506

(58) Field of Classification Search
CPC ... H04L 5/0091; H04L 1/1861; H04L 5/0023; H04L 1/1858; H04W 72/1268; H04W 72/21; H04W 72/23; H04B 7/0404; H04B 7/0408; H04B 7/0695

See application file for complete search history.

(56) References Cited

U.S. PATENT DOCUMENTS

| | | | |
|---|---|---|---|
| 2019/0182824 A1 | 6/2019 | Chatterjee | |
| 2020/0205150 A1* | 6/2020 | Cheng | H04W 72/21 |
| 2021/0159966 A1* | 5/2021 | Xi | H04B 7/088 |
| 2021/0259004 A1* | 8/2021 | Takeda | H04L 1/08 |
| 2021/0336664 A1* | 10/2021 | Yang | H04W 72/21 |
| 2021/0410124 A1* | 12/2021 | Chen | H04L 5/0053 |
| 2022/0030443 A1* | 1/2022 | Chen | H04W 72/21 |
| 2022/0124633 A1* | 4/2022 | Hoshino | H04W 16/28 |
| 2022/0200752 A1* | 6/2022 | Matsumura | H04L 5/0048 |
| 2022/0225362 A1* | 7/2022 | Yi | H04L 1/1864 |
| 2022/0256522 A1* | 8/2022 | Matsumura | H04L 5/0023 |
| 2024/0323976 A1* | 9/2024 | Gao | H04W 72/232 |

OTHER PUBLICATIONS

CATT, Multi-TRP/panel transmission enhancement for Rel-16, 3GPP TSG RAN WG1 Meeting #95, R1-1812635, Nov. 12-16, 2018, pp. 1-12, Spokane, USA.

NTT Docomo, Inc., Discussion on multi-beam enhancement, 3GPP TSG RAN WG1 #97, R1-1906225, May 13-17, 2019, pp. 1-24, Reno, USA.

NTT Docomo, Inc, Enhancements on multi-TRP/panel transmission, 3GPP TSG RAN WG1 #97, R1-1906224, May 13-17, 2019, pp. 1-32, Reno, USA.

CAICT, Discussion on URLLC reliability/robustness enhancement with multi-TRP/panel, 3GPP TSG RAN WG1 #96, R1-1902926, Feb. 25-Mar. 1, 2019, pp. 1-3, Athens, Greece.

* cited by examiner

APPARATUS AND METHOD OF PUCCH REPETITION USING MULTIPLE BEAMS

FIELD

The subject matter disclosed herein relates generally to wireless communication, and more particularly relates to, but not limited to, apparatus and methods of Physical Uplink Control Channel (PUCCH) repetition using multiple beams.

BACKGROUND

The following abbreviations and acronyms are herewith defined, at least some of which are referred to within the following description.

Third Generation Partnership Project ("3GPP"), 5th Generation ("5G"), New Radio ("NR"), 5G Node B ("gNB"), Long Term Evolution ("LTE"), LTE Advanced ("LTE-A"), Evolved Node B ("eNB"), Universal Mobile Telecommunications System ("UMTS"), Worldwide Interoperability for Microwave Access ("WiMAX"), Evolved UMTS Terrestrial Radio Access Network ("E-UTRAN"), Wireless Local Area Networking ("WLAN"), Orthogonal Frequency Division Multiplexing ("OFDM"), Single-Carrier Frequency-Division Multiple Access ("SC-FDMA"), Downlink ("DL"), Uplink ("UL"), User Entity/Equipment ("UE"), Network Equipment ("NE"), millimeter Wave ("mmWave"), Hybrid Automatic Repeat Request ("HARQ"), Acknowledgement ("ACK"), Hybrid Automatic Repeat Request Acknowledgement ("HARQ-ACK"), Radio Access Technology ("RAT"), Negative Acknowledgement ("NACK"), Receive ("RX"), Transmit ("TX"), Bandwidth Part ("BWP"), Downlink Control Information ("DCI"), Physical Downlink Shared Channel ("PDSCH"), Physical Uplink Shared Channel ("PUSCH"), Radio Resource Control ("RRC"), Logical Channel ID ("LCID"), MAC Control Element ("MAC CE"), Medium Access Control ("MAC"), Physical Downlink Control Channel ("PDCCH"), Protocol Data Unit ("PDU"), Physical Uplink Control Channel ("PUCCH"), Transmit Receive Points ("TRP"), Uplink Control Information ("UCI"), Control Element ("CE"), Identification ("ID").

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations, and a base station may perform wireless communication with the UEs.

The 5G New Radio (NR) is the latest in the series of 3GPP standards which supports very high data rate with lower latency compared to its predecessor LTE (4G) technology.

As a fundamental building component to enable the NR system, Physical Uplink Control Channel (PUCCH) is mainly utilized to convey a set of information called an Uplink Control Information (UCI).

In NR Release 15, a PUCCH repetition is supported for improving the robustness of a PUCCH transmission. For PUCCH formats 1, 3, or 4, a UE can be configured with a number of slots, $N_{PUCCH}^{repeat}$, for repeating a PUCCH transmission in respective nrofSlots. For $N_{PUCCH}^{repeat}>1$, the UE repeats the PUCCH transmission with the UCI over $N_{PUCCH}^{repeat}$ slots. The details of PUCCH repetition in NR Release 15 are specified in TS 38.213 9.2.6 "PUCCH repetition procedure".

However, in NR Release 15, the same transmitting beam is used to transmit each PUCCH repetition since only one beam which is represented by a spatial relation information in NR specification is configured for one PUCCH resource. Since the beam for all PUCCH repetitions is the same, if one PUCCH repetition is blocked, then all the repetitions may be blocked in high carrier frequency e.g. >6 GHz.

SUMMARY

According to a first aspect, there is provided an apparatus comprising: a receiver that receives a configuration data indicating a spatial relation information set for a Physical Uplink Control Channel (PUCCH) resource that is configured with a preset number of repetitions, wherein the spatial relation information set is activated for the PUCCH resource by a Medium Access Control (MAC) Control Element (CE); and a transmitter that transmits each of the PUCCH repetitions in multiple time intervals according to a mapping between the spatial relation information set and each repetition According to a second aspect, there is provided an apparatus comprising: a transmitter that transmits a configuration data indicating a spatial relation information set of a Physical Uplink Control Channel (PUCCH) resource that is configured with a preset number of repetitions, wherein the spatial relation information set is activated for the PUCCH resource by a Medium Access Control (MAC) Control Element (CE); and a receiver that receives each of the PUCCH repetitions in multiple time intervals according to a mapping between the spatial relation information set and each repetition.

According to a third aspect, there is provided a method comprising: receiving, by a receiver, a configuration data indicating a spatial relation information set of a Physical Uplink Control Channel (PUCCH) resource that is configured with a preset number of repetitions, wherein the spatial relation information set is activated for the PUCCH resource by a Medium Access Control (MAC) Control Element (CE); and transmitting, by a transmitter, each of the PUCCH repetitions in multiple time intervals according to a mapping between the spatial relation information set and each repetition.

According to a fourth aspect, there is provided a method comprising: transmitting, by a transmitter, a configuration data indicating a spatial relation information set of a Physical Uplink Control Channel (PUCCH) resource that is configured with a preset number of repetitions, wherein the spatial relation information set is activated for the PUCCH resource by a Medium Access Control (MAC) Control Element (CE); and receiving, by a receiver, each of the PUCCH repetitions in multiple time intervals according to a mapping between the spatial relation information set and each repetition.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable Compact Disc Read-Only Memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", "an example", "some embodiments", or similar language means that a particular feature, structure, or characteristic described in connection with the embodiment is included in at least one embodiment. Thus, appearances of the phrases "in one embodiment", "in an embodiment", "in some embodiments", and similar language throughout this specification may, but do not necessarily, all refer to the same embodiment(s), but mean "one or more embodiments". These may or may not include all the embodiments disclosed. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a 'second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

Figure 1:
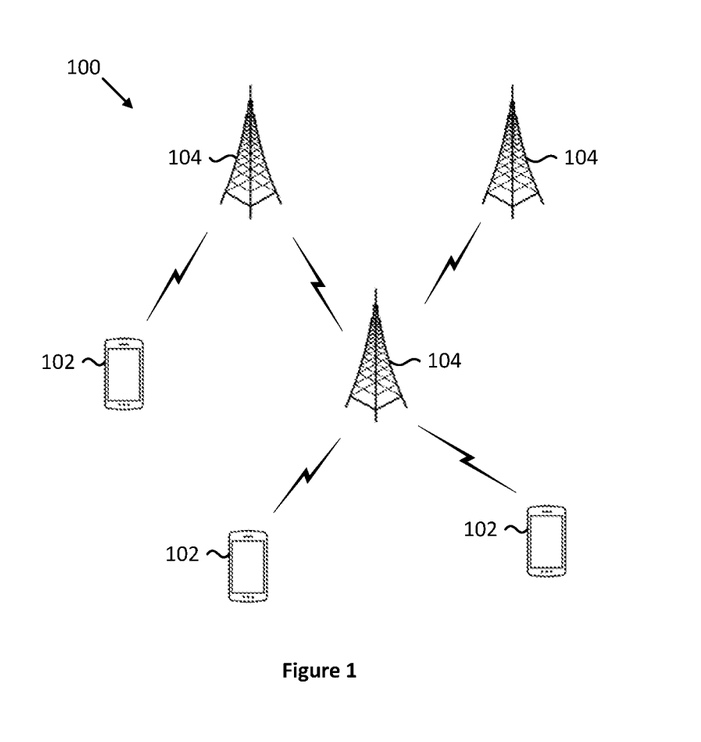
FIG. 1 is a schematic diagram illustrating a wireless communication system.

FIG. 1 is a schematic diagram illustrating a wireless communication system. It depicts an embodiment of a wireless communication system 100 for PUCCH repetition using multiple beams. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the UL using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Figure 2:
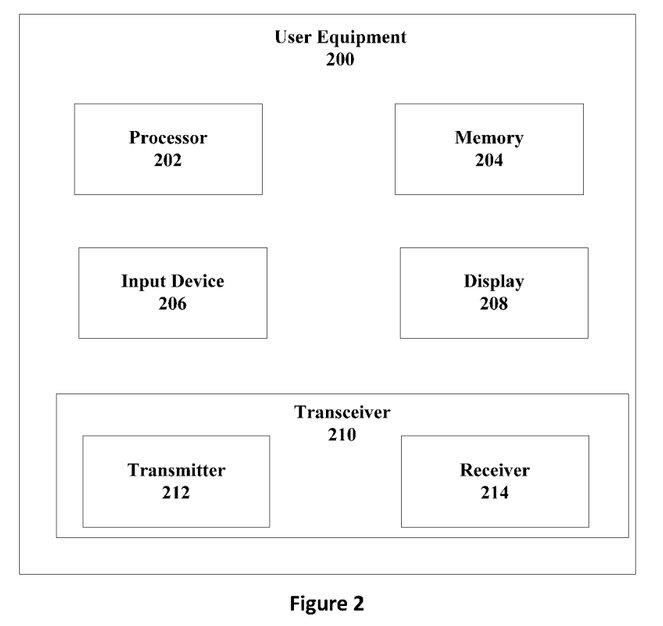
FIG. 2 is a schematic block diagram illustrating components of user equipment (UE) according to one embodiment.

FIG. 2 is a schematic block diagram illustrating components of user equipment (UE) according to one embodiment. A UE 200 may be an apparatus that transmits PUCCH repetitions with multiple beams and it may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and display 208 may form a touchscreen or similar touch-sensitive display. In other embodiments, the display 208 may be located near the input device 206.

Figure 4:
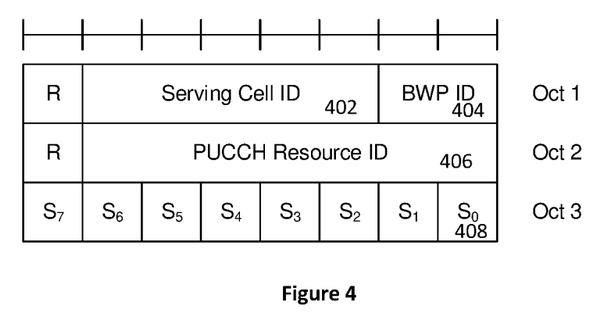
FIG. 4 is a schematic diagram illustrating PUCCH spatial relation Activation/Deactivation Medium Access Control (MAC) Control Element (CE) according to one embodiment.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment. For example, the transmitter 212 may transmit a PUCCH resource several times, or repetitions. As another example, the receiver 214 may receive various configuration data from the network equipment. In some embodiments, the receiver 214 may receive such configuration data indicating a spatial relation information set for a PUCCH resource that is configured with a preset number of PUCCH resource repetitions, wherein each spatial relation information of the spatial relation information set is activated for the PUCCH resource by a MAC CE. Activation of a spatial relation information of the spatial relation information set is achieved by a procedure in MAC layer, namely by transmitting a MAC CE as shown in FIG. 4. Accordingly, a beam represented by a spatial relation information may be used to transmit the PUCCH resource only when the spatial relation information is activated. The transmitter 212 may transmit each of the PUCCH repetitions in multiple time intervals according to the mapping between the spatial relation information set and each PUCCH repetition. The terms "PUCCH repetitions", "PUCCH resource repetitions", and "repetitions" may be used interchangeably in this disclosure.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
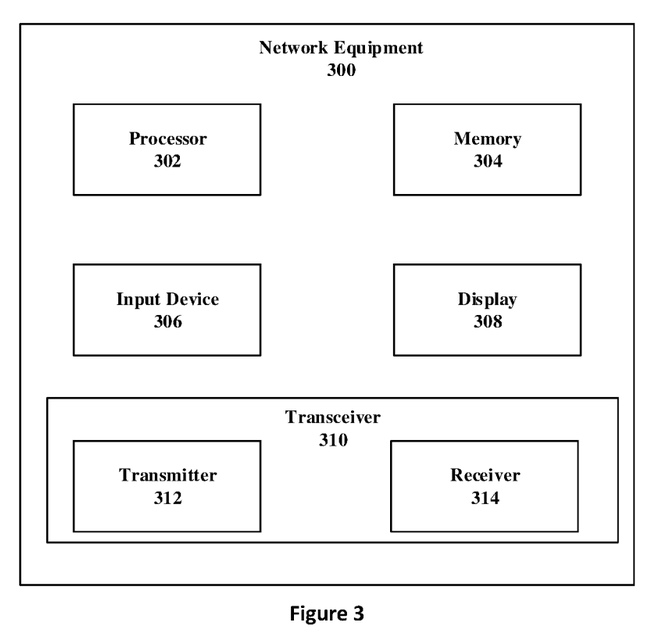
FIG. 3 is a schematic block diagram illustrating components of network equipment (NE) according to one embodiment.

FIG. 3 is a schematic block diagram illustrating components of network equipment (NE) 300 according to one embodiment. The NE 300 may be an apparatus that receives PUCCH repetitions by using multiple transmission beams and it may represent an exemplary implementation of the NE 104 of FIG. 1.

The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals/data to the UE 200. The processor 302 may also control the transceiver 310 to receive UL signals/data from the UE 200. For example, the processor 302 may control the transceiver 310 to receive a PUCCH resource several times in a repetitive manner, i.e. PUCCH resource repetitions. In another example, the processor 302 may control the transceiver 310 to transmit DL signals containing various configuration data to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200. For example, the receiver 314 may receive PUCCH resource repetitions from the UE 200. As another example, the transmitter 312 may transmit various configuration data from the NE 300. In some embodiments, the transmitter 312 may transmit a configuration data indicating a spatial relation information for a PUCCH resource that is configured with a preset number of PUCCH resource repetitions, wherein the spatial relation information is activated for the PUCCH resource by a MAC CE. The receiver 314 may receive each of the PUCCH resource repetitions in multiple time intervals according to a mapping between the spatial relation information set and each PUCCH resource repetition.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, wherein the transceiver 310 includes a transmitter 312 and a receiver 314 for each cell or cell sector.

In the disclosure, the term "spatial relation information" refers to a set of information, reference signals or a block of data bits, that is capable of identifying a beam providing a communication link between a base station and a remote device. The terms "spatial relation information set" is composed of multiple pieces of spatial relation information which represents multiple beams.

In NR Release 16, multiple Transmit and Receive Points (TRPs) are supported, and multiple beam links between a UE and multiple TRPs in a same cell may be maintained. The multiple beam links may be utilized to improve the robustness of a PUCCH transmission.

A PUCCH resource may be configured with multiple beams, which means it can be activated for transmission with a spatial relation information set which represent multiple spatial relation information IDs or multiple beams by the MAC CE if the PUCCH is configured to support PUCCH resource repetition by high layer.

FIG. 4 shows PUCCH spatial relation Activation/Deactivation Medium Access Control (MAC) Control Element (CE) as specified in specification TS 38.321.

The PUCCH spatial relation Activation/Deactivation MAC CE is identified by a MAC Protocol Data Unit (PDU) subheader with Logical Channel ID (LCID). It has a fixed size of 24 bits with following fields:

- Serving Cell ID: This field indicates the identity of the Serving Cell for which the MAC CE applies. The length of the field is 5 bits;
- Bandwidth Part (BWP) ID: This field contains BWP-Id, as specified in TS 38.331, of an uplink bandwidth part for which the MAC CE applies. The length of the BWP ID field is 2 bits;
- PUCCH Resource ID: This field contains an identifier of the PUCCH resource ID identified by PUCCH-ResourceId as specified in TS 38.331. The length of the field is 7 bits;
- $S_i$: If there is a PUCCH Spatial Relation Info with PUCCH-SpatialRelationInfoId i as specified in TS 38.331, configured for the uplink bandwidth part indicated by BWP ID field, $S_i$ indicates the activation status of PUCCH Spatial Relation Info with PUCCH-SpatialRelationInfoId i, otherwise MAC entity shall ignore this field. The $S_i$ field is set to "1" to indicate PUCCH Spatial Relation Info with PUCCH-SpatialRelationInfoId i should be activated. The $S_i$ field is set to "0" to indicate PUCCH Spatial Relation Info with PUCCH-SpatialRelationInfoId i should be deactivated. Only a single PUCCH Spatial Relation Info can be active for a PUCCH Resource at a time;
- R: Reserved bit, set to "0".

In NR Release 15, only one Si (0-7) can be set as "1", which means only one PUCCH-SpatialRelationInfoId i is activated for the PUCCH Resource ID. That is, only one beam is configured for repetitions of one PUCCH resource in NR Release 15.

According to some embodiments of this disclosure, multiple beams represented by PUCCH-SpatialRelationInfoId can be activated for one PUCCH resource if the PUCCH resource is configured for repetition. It means that multiple Si bits in the MAC CE PDU can be set as "1" in the PUCCH spatial relation information activation procedure if the PUCCH resource is configured as repetition PUCCH resource. The multiple beams or spatial relation information IDs can be represented by a spatial relation information set.

Methods indicating the mapping between each PUCCH resource transmission of Nrep PUCCH resource repetitions configured in RRC and each PUCCH spatial relation information of the PUCCH spatial relation information set activated by MAC CE are also disclosed. In the disclosure, it is assumed that there are M spatial relation information IDs activated for the PUCCH resource configured for Nrep repetitions, and the M spatial relation information IDs are in an ascending order according to the ID values. Several methods of indicating the spatial relation information for each PUCCH repetition (i.e. methods of mapping each spatial relation information of the spatial relation information set with the PUCCH resource repetition) are disclosed.

Method 1:

A UE determines which spatial relation information of the activated spatial relation information set for the PUCCH resource is used to transmit each PUCCH repetition. In some embodiments, a preset mapping may be determined and used by the UE to transmit the PUCCH resource repetitions. In some other embodiments, the UE may use any arbitrary mapping to select a beam to transmit the PUCCH resource repetitions. There is a precondition to apply this method, which is that the base station or gNB can receive the PUCCH resource transmitted with any spatial relation information of the activated spatial relation information set by using a same receiver beam. As a beam may be represented by a spatial relation information, the activation of a spatial relation information set may also be referred to as activation of multiple beams. The method may be applied in the case that the activated multiple beams can be received by the gNB with a same receiver beam.

Figure 5A:
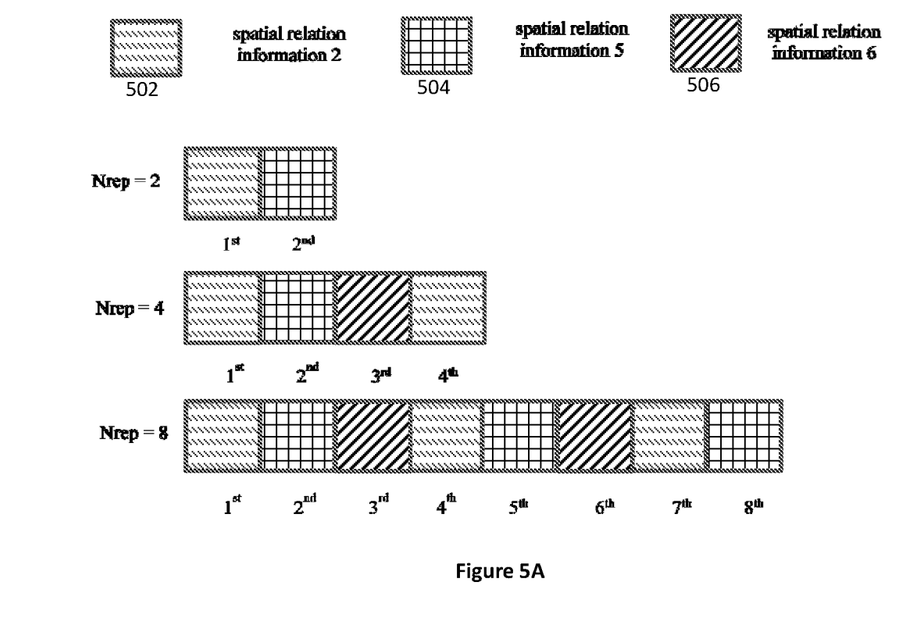
FIG. 5A is a schematic diagram illustrating PUCCH repetition transmission according to one embodiment.

Method 2:

FIG. 5A is a schematic diagram illustrating PUCCH resource repetition transmission according to one embodiment.

A scheme of beam cycling may be used. For example, the $i^{th}$ spatial relation information IDs of the M spatial relation information IDs are used to transmit the j*M+i resource repetition where j=0, . . . ceil(Nrep/M)−1. Here, the function ceil(x) returns the smallest integer that is greater than or equal to x, i.e. rounds up to the nearest integer.

In an exemplary embodiment shown in FIG. 5A, three spatial relation information IDs are activated for a PUCCH resource configured with Nrep repetitions, and the three spatial relation information IDs are spatial relation information 2 identified by block pattern 502, spatial relation information 5 identified by block pattern 504 and spatial relation information 6 identified by block pattern 506.

If Nrep=2, the spatial relation information IDs used by the UE for transmitting 2 PUCCH resource repetitions are spatial relation information 2 and spatial relation information 5 respectively.

If Nrep=4, the spatial relation information IDs used by the UE for transmitting the 4 PUCCH resource repetitions are spatial relation information 2, spatial relation information 5, spatial relation information 6 and spatial information 2 respectively.

If Nrep=8, the spatial relation information IDs used by the UE for transmitting the 8 PUCCH resource repetitions are spatial relation information 2, spatial relation information 5, spatial relation information 6, spatial relation information 2, spatial relation information 5, spatial relation information 6, spatial relation information 2, and spatial relation information 5 respectively.

Here, each spatial relation information of the activated spatial relation information set is used in turn to support transmission of a preset number of repetitions (Nrep repetitions).

Figure 5B:
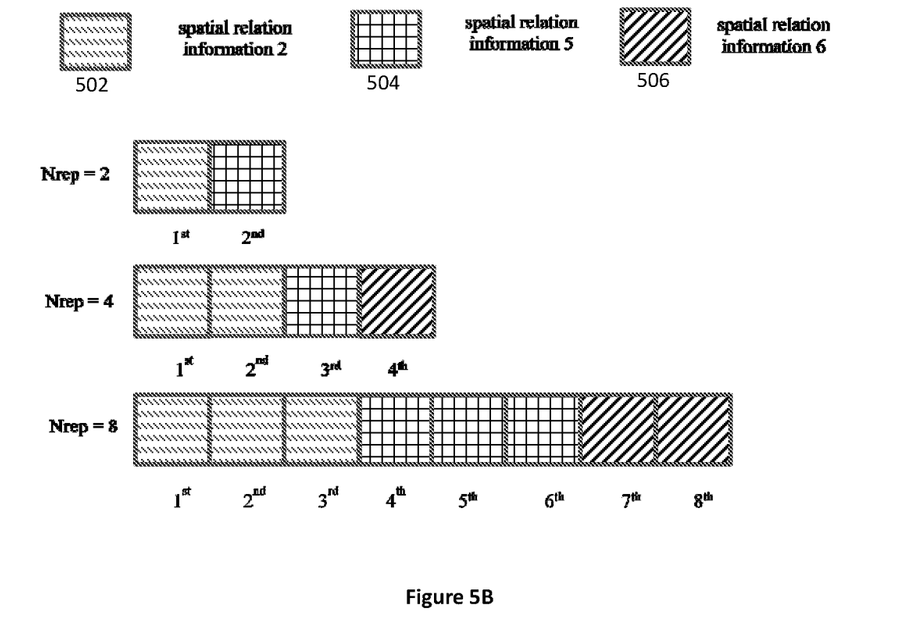
FIG. 5B is a schematic diagram illustrating PUCCH repetition transmission according to one embodiment.

Method 3:

FIG. 5B is another schematic diagram illustrating PUCCH repetition transmission according to one embodiment.

Each of the first mod(Nrep−1,M)+1 spatial relation information IDs of M spatial relation information IDs is used to transmit ceil(Nrep/M) repetitions continuously, and each of the remaining spatial relation information IDs is used to transmit floor(Nrep/M) repetitions continuously. Here, the function mod(x,y) returns a numeric value corresponding to x modulo y, i.e. the remainder of x divided by y; the function ceil(x) returns the smallest integer that is greater than or equal to x, i.e. rounds up to the nearest integer; and the function floor(x) returns the largest integer less than or equal to x, i.e. rounds down to the nearest integer.

Here, each spatial relation information of the activated spatial relation information set is used for a sub-group of Nrep repetitions, and each sub-group of Nrep repetitions is continuously transmitted using a same spatial relation information.

In an exemplary embodiment shown in FIG. 5B, M=3, and if Nrep=2, mod(2−1,3)+1=2, ceil(2/3)=1, and floor(2/3)=0. Each of the first 2 spatial information IDs of the 3 spatial relation information IDs will be used to transmit 1 repetition continuously, which means the spatial relation information 2 is used to transmit the first repetition and the spatial relation information 5 is used to transmit the second repetition.

If Nrep=4, mod(4−1,3)+1=1, ceil(4/3)=2, and floor(4/3)=1. The first spatial information IDs of the 3 spatial relation information IDs will be used to transmit 2 repetitions continuously, which means the spatial relation information 2 is used to transmit the first 2 repetitions. And each of the remaining spatial relation information IDs, which are spatial relation information 5 and spatial relation information 6, is used to transmit 1 repetition. It means that the spatial information relation information IDs of the $3^{rd}$ and $4^{th}$ repetition are spatial relation information 5 and spatial relation information 6 respectively.

If Nrep=8, mod(8−1,3)+1=2, ceil(8/3)=3, and floor(8/3)=2. Each of the first 2 spatial information IDs of the 3 spatial relation information IDs will be used to transmit 3 repetitions continuously, which means the spatial relation information 2 is used to transmit the first 3 repetitions and the spatial relation information 5 is used to transmit the $4^{th}$, $5^{th}$ and $6^{th}$ repetitions. The remaining 1 spatial relation information ID, which is spatial relation information 6, is used to transmit 2 repetitions. That is, the spatial relation information 6 is used to transmit the $7^{th}$ and $8^{th}$ repetitions.

Either one of Method 2 and Method 3 may be fixed, or set as default, to be used in PUCCH resource repetitions if a spatial relation information set is activated by MAC CE.

Alternatively, one of Method 1 and Method 2 may be configured in higher layer (e.g. RRC) to indicate the UE how to transmit the PUCCH resource repetitions using the spatial relation information set. More generally, other mappings between the spatial relation information set and each repetition may also be configured in the RRC.

Method 4:

The beam pattern used for PUCCH resource repetition, or the mapping between a spatial relation information set and each PUCCH resource repetition, may be indicated in the Downlink Control Information (DCI).

Since Hybrid Automatic Repeat Request Acknowledgement (HARQ-ACK) of Physical Downlink Shared Channel (PDSCH) with a DCI is carried in a PUCCH resource, if the PUCCH resource indicated in the DCI is a PUCCH resource configured as a repetition PUCCH resource, a field in the DCI can indicate the beam pattern for the PUCCH resource repetition.

For example, if the PUCCH carrying HARQ-ACK with the corresponding DCI, and the spatial relation information IDs activated for the PUCCH resource are spatial relation information 1, spatial relation information 3, spatial relation information 4 and spatial relation information 6. In this example, for simplicity purpose only, Beam 1, Beam 2, Beam 3 and Beam 4 are used to represent spatial relation information 1, spatial relation information 3, spatial relation information 4 and spatial relation information 6 respectively.

In one example, a DCI field may have 2 bits to indicate the spatial relation information ID used for each repetition, or the mapping between the spatial relation information IDs and each repetition. Table 1 shows the mapping of repetitions and beams with Nrep=2 in different DCI indicators.

TABLE 1

| repetition and beam mapping in Nrep = 2 | | |
| --- | --- | --- |
| DCI | Nrep = 1 | Nrep = 2 |
| 00 | Beam 1 | Beam 2 |
| 01 | Beam 2 | Beam 1 |
| 10 | Beam 1 | Beam 3 |
| 11 | Beam 2 | Beam 4 |

Table 2 shows the mapping of repetitions and beams with Nrep=4 in different DCI indicators.

TABLE 2

| repetition and beam mapping in Nrep = 4 | | | | |
| --- | --- | --- | --- | --- |
| DCI | Nrep = 1 | Nrep = 2 | Nrep = 3 | Nrep = 4 |
| 00 | Beam 1 | Beam 2 | Beam 3 | Beam 4 |
| 01 | Beam 1 | Beam 1 | Beam 2 | Beam 2 |
| 10 | Beam 3 | Beam 3 | Beam 4 | Beam 4 |
| 11 | Beam 4 | Beam 3 | Beam 2 | Beam 1 |

Table 3 shows the mapping of repetitions and beams with Nrep=8 in different DCI indicators.

TABLE 3

| repetition and beam mapping in Nrep = 8 | | | | | | | | |
| --- | --- | --- | --- | --- | --- | --- | --- | --- |
| DCI | Nrep = 1 | Nrep = 2 | Nrep = 3 | Nrep = 4 | Nrep = 5 | Nrep = 6 | Nrep = 7 | Nrep = 8 |
| 00 | Beam 1 | Beam 2 | Beam 3 | Beam 4 | Beam 1 | Beam 2 | Beam 3 | Beam 4 |
| 01 | Beam 1 | Beam 1 | Beam 2 | Beam 2 | Beam 3 | Beam 3 | Beam 4 | Beam 4 |
| 10 | Beam 1 | Beam 1 | Beam 1 | Beam 1 | Beam 2 | Beam 2 | Beam 2 | Beam 2 |
| 11 | Beam 3 | Beam 3 | Beam 3 | Beam 3 | Beam 4 | Beam 4 | Beam 4 | Beam 4 |

In some embodiments, when both RRC and DCI indicate the beam pattern for one PUCCH resource with repetition, the beam pattern indicated in DCI overwrites the beam pattern configured in RRC. It means that the UE should follow the indicator in the DCI to transmit each PUCCH repetition.

The repetitions of PUCCH resource occupy consecutive slots in NR Release 15 and there is a time consumption between beam switching at the UE side in the above methods. Such a beam switching time due to beam switching may be fixed in specification, alternatively a UE may be enabled to report the beam switching time to the gNB. If the time gap between two consecutive PUCCH repetitions is equal to or larger than the beam switching time of a UE, the PUCCH resource can be activated with multiple beams and be transmitted with multiple beams. Otherwise, if the time gap between two consecutive PUCCH repetitions is smaller than the beam switching time of a UE, two solutions are provided to solve this problem.

Solution 1:

The first spatial relation information activated by MAC CE for the PUCCH resource is used to transmit all the repetitions ignoring the beam pattern configured in RRC or indicated in DCI. Alternatively, the UE may autonomously select one spatial relation information ID out of the multiple activated spatial relation information IDs to transmit all the repetitions.

Figure 6:
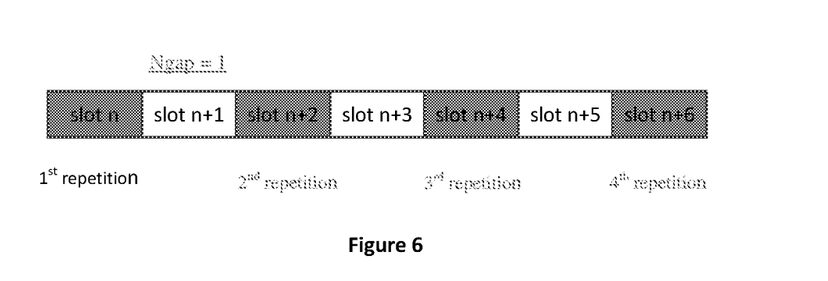
FIG. 6 is a schematic diagram illustrating non-consecutive PUCCH repetition according to one embodiment.

Solution 2:

The repetitions of the PUCCH resource may not be consecutive in slots, as shown in FIG. 6.

FIG. 6 is a schematic diagram illustrating non-consecutive PUCCH repetition according to one embodiment. Assuming that there are Ngap slots between two successive PUCCH resource repetitions. With appropriate value of Ngap set, the time gap between the two successive PUCCH repetitions may be larger than the beam switching time and multiple beams can be used to transmit the PUCCH repetitions using the disclosed methods above. The example in FIG. 6 shows a non-consecutive PUCCH resource repetition with Ngap=1. The Ngap may be configured in RRC. In a special case where Ngap=0, it is the same as consecutive PUCCH resource repetition specified in NR Release 15.

That is, when the switching time between two beams represented by two spatial relation information IDs respectively is determined to be larger than the time gap between two consecutive PUCCH resource repetitions, the UE transmits a successive PUCCH resource repetition after transmission of a previous PUCCH resource repetition with a gap period of a preset number of slots or time intervals.

Figure 7:
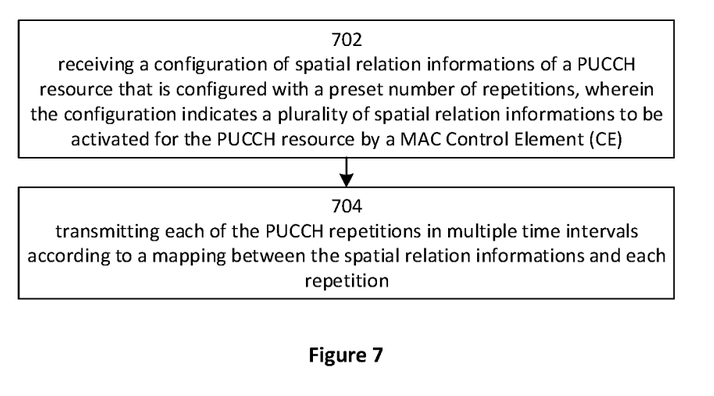
FIG. 7 is a flow chart illustrating steps of PUCCH repetition transmission according to one embodiment.

FIG. 7 is a flow chart illustrating steps of PUCCH resource repetition transmission at the UE side.

At step 702, the receiver 214 at the UE side receives a configuration data indicating a spatial relation information set for a Physical Uplink Control Channel (PUCCH) resource that is configured with a preset number of repetitions, wherein the spatial relation information set is activated for the PUCCH resource repetition by a Medium Access Control (MAC) Control Element (CE).

At step 704, the transmitter 212 at the UE side transmits each of the PUCCH resource repetitions in multiple time intervals according to a mapping between each spatial relation information of the spatial relation information set and each PUCCH resource repetition.

The mapping between the spatial relation information set and each repetition may be configured in Radio Resource Control (RRC).

In an embodiment, the mapping may be preset and the transmitter 212 transmits the PUCCH resource repetitions using the activated spatial relation information set with the preset mapping.

In an embodiment, the mapping is that each spatial relation information of the activated spatial relation information set is used in turn for the preset number of repetitions.

In an embodiment, the mapping is that each spatial relation information of the activated spatial relation information set is used for a sub-group of the preset number of repetitions. The sub-group of the preset number of repetitions may be continuously transmitted using a same spatial relation information. In the embodiment, the transmitter 212 transmits: ceil(Nrep/M) repetitions, continuously, using each of first mod(Nrep−1,M)+1 spatial relation information, and floor(Nrep/M) repetitions, continuously, using each spatial relation information of the remaining spatial relation information, where Nrep represents the preset number of repetitions, and M represents the number of the spatial relation information of the activated spatial relation information.

In an embodiment, the mapping is indicated in a Downlink Control Information (DCI). The DCI may include a field with 2 bits for indicating a selected scheme of mapping.

When the mapping is configured in RRC and is also indicated in a DCI, the mapping indicated in the DCI overwrites that configured in RRC.

It takes some time when switching beams. This time duration may be called beam switching time. Upon determining that a beam switching time between beams identified by spatial relation information IDs is larger than a time gap between two consecutive PUCCH resource repetitions, the transmitter 212 may select one spatial relation information from the activated spatial relation information set to transmit all the PUCCH repetitions or transmit a successive PUCCH repetition after transmission of a previous PUCCH repetition with a gap period of a preset number of time intervals.

Figure 8:
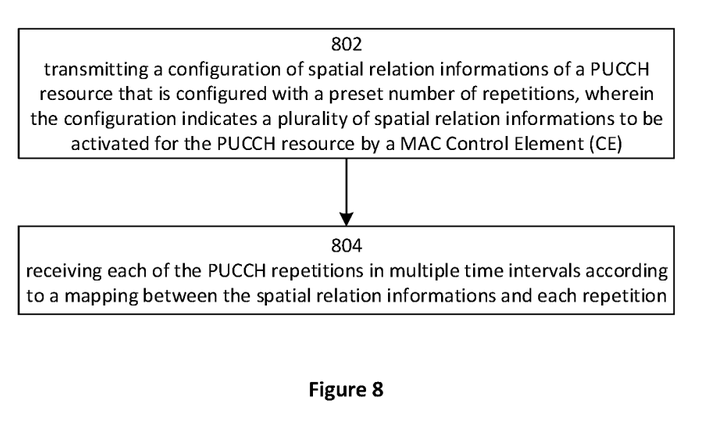
FIG. 8 is a flow chart illustrating steps of steps of PUCCH repetition transmission according to one embodiment.

FIG. 8 is a flow chart illustrating steps of PUCCH resource repetition transmission at the NE side.

At step 802, the transmitter 312 at the NE side transmits a configuration data indicating a spatial relation information set for a Physical Uplink Control Channel (PUCCH) resource that is configured with a preset number of PUCCH resource repetitions, wherein the spatial relation information set is activated for the PUCCH resource by a Medium Access Control (MAC) Control Element (CE).

At step 804, the receiver 314 at the NE side receives each of the PUCCH resource repetitions in multiple time intervals according to a mapping between the spatial relation information set and each repetition. The details of the mapping between each spatial relation information of the spatial relation information set and each repetition are discussed above, and thus are not repeated here.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. A user equipment (UE), comprising:
  at least one memory; and
  at least one processor coupled with the at least one memory and configured to cause the UE to:
    receive a configuration data indicating a spatial relation information set for a physical uplink control channel (PUCCH) resource that is configured with a preset number of repetitions, wherein the spatial relation information set is activated for the PUCCH resource by a medium access control (MAC) control element (CE);
    transmit each of the PUCCH repetitions in multiple time intervals according to a mapping between the spatial relation information set and the preset number of repetitions; and
    transmit each of the PUCCH repetitions with a quantity of slots between each time interval of the multiple time intervals, the quantity of slots being configured by radio resource control (RRC) signaling,
  wherein:
    the mapping is configured in radio resource control (RRC); and
    the mapping configured in RRC indicates whether spatial information of the spatial relation information set is to be mapped to the number of repetitions in a cyclical or non-cyclical manner.

2. The UE of claim 1, wherein the spatial relation information set is composed of one or more pieces of spatial relation information.

3. The UE of claim 1, wherein the mapping is that each spatial relation information of the activated spatial relation information set is used as a cyclic manner according to the preset number of repetitions.

4. The UE of claim 1, wherein the mapping is that each spatial relation information of the activated spatial relation information is used for a sub-group of the preset number of repetitions.

5. The UE of claim 4, wherein the sub-group of the preset number of repetitions is continuously transmitted using a same spatial relation information.

6. The UE of claim 1, wherein the PUCCH resource is configured with the preset number of repetitions via radio resource control (RRC) signaling.

7. A base station, comprising:
  at least one memory; and
  at least one processor coupled with the at least one memory and configured to cause the base station to:
    transmit a configuration data indicating a spatial relation information set for a physical uplink control channel (PUCCH) resource that is configured with a preset number of repetitions, wherein the spatial relation information set is activated for the PUCCH resource by a medium access control (MAC) control element (CE);
    receive each of the PUCCH repetitions in multiple time intervals according to a mapping between the spatial relation information set and the preset number of repetitions; and
    receive each of the PUCCH repetitions with a quantity of slots between each time interval of the multiple time intervals, the quantity of slots being configured by radio resource control (RRC) signaling,
  wherein:
    the mapping is configured in radio resource control (RRC); and
    the mapping configured in RRC indicates whether spatial information of the spatial relation information set is to be mapped to the number of repetitions in a cyclical or non-cyclical manner.

8. The base station of claim 7, wherein the spatial relation information set is composed of one or more pieces of spatial relation information.

9. The base station of claim 7, wherein the mapping is that each spatial relation information of the activated spatial relation information set is used as a cyclic manner according to the preset number of repetitions.

10. The base station of claim 7, wherein the mapping is that each spatial relation information of the activated spatial relation information set is used for a sub-group of the preset number of repetitions.

11. The base station of claim 10, wherein the sub-group of the preset number of repetitions is continuously transmitted using a same spatial relation information.

12. A method performed by a user equipment (UE), the method comprising:
  receiving a configuration data indicating a spatial relation information set for a physical uplink control channel (PUCCH) resource that is configured with a preset number of repetitions, wherein the spatial relation information set is activated for the PUCCH resource by a medium access control (MAC) control element (CE);
  transmitting each of the PUCCH repetitions in multiple time intervals according to a mapping between the spatial relation information set and the preset number of repetitions; and
  transmitting each of the PUCCH repetitions with a quantity of slots between each time interval of the multiple time intervals, the quantity of slots being configured by radio resource control (RRC) signaling,
  wherein:
    the mapping is configured in radio resource control (RRC); and
    the mapping configured in RRC indicates whether spatial information of the spatial relation information set is to be mapped to the number of repetitions in a cyclical or non-cyclical manner.

13. The method of claim 12, wherein the spatial relation information set is composed of one or more pieces of spatial relation information.

14. The method of claim 12, wherein the mapping is that each spatial relation information of the activated spatial relation information set is used as a cyclic manner according to the preset number of repetitions.

15. The method of claim 12, wherein the mapping is that each spatial relation information of the activated spatial relation information set is used for a sub-group of the preset number of repetitions.

16. The method of claim 15, wherein the sub-group of the preset number of repetitions is continuously transmitted using a same spatial relation information.

17. The method of claim 12, wherein the mapping is indicated in a downlink control information (DCI).

18. The method of claim 12, wherein the mapping is configured in RRC and is indicated in a DCI, and the mapping indicated in the DCI overwrites that configured in RRC.

19. A method performed by a base station, comprising:
  transmitting a configuration data indicating a spatial relation information set for a physical uplink control channel (PUCCH) resource that is configured with a preset number of repetitions, wherein the spatial relation information set is activated for the PUCCH resource by a medium access control (MAC) control element (CE);

receiving each of the PUCCH repetitions in multiple time intervals according to a mapping between the spatial relation information set and the preset number of repetitions; and receiving each of the PUCCH repetitions with a quantity of slots between each time interval of the multiple time intervals, the quantity of slots being configured by radio resource control (RRC) signaling, wherein:
- the mapping is configured in radio resource control (RRC); and
- the mapping configured in RRC indicates whether spatial information of the spatial relation information set is to be mapped to the number of repetitions in a cyclical or non-cyclical manner.

\* \* \* \* \*